No. 647,430. Patented Apr. 10, 1900.
P. G. VETTER.
LOCK.
(Application filed Dec. 23, 1899.)
(No Model.) 3 Sheets—Sheet 1.
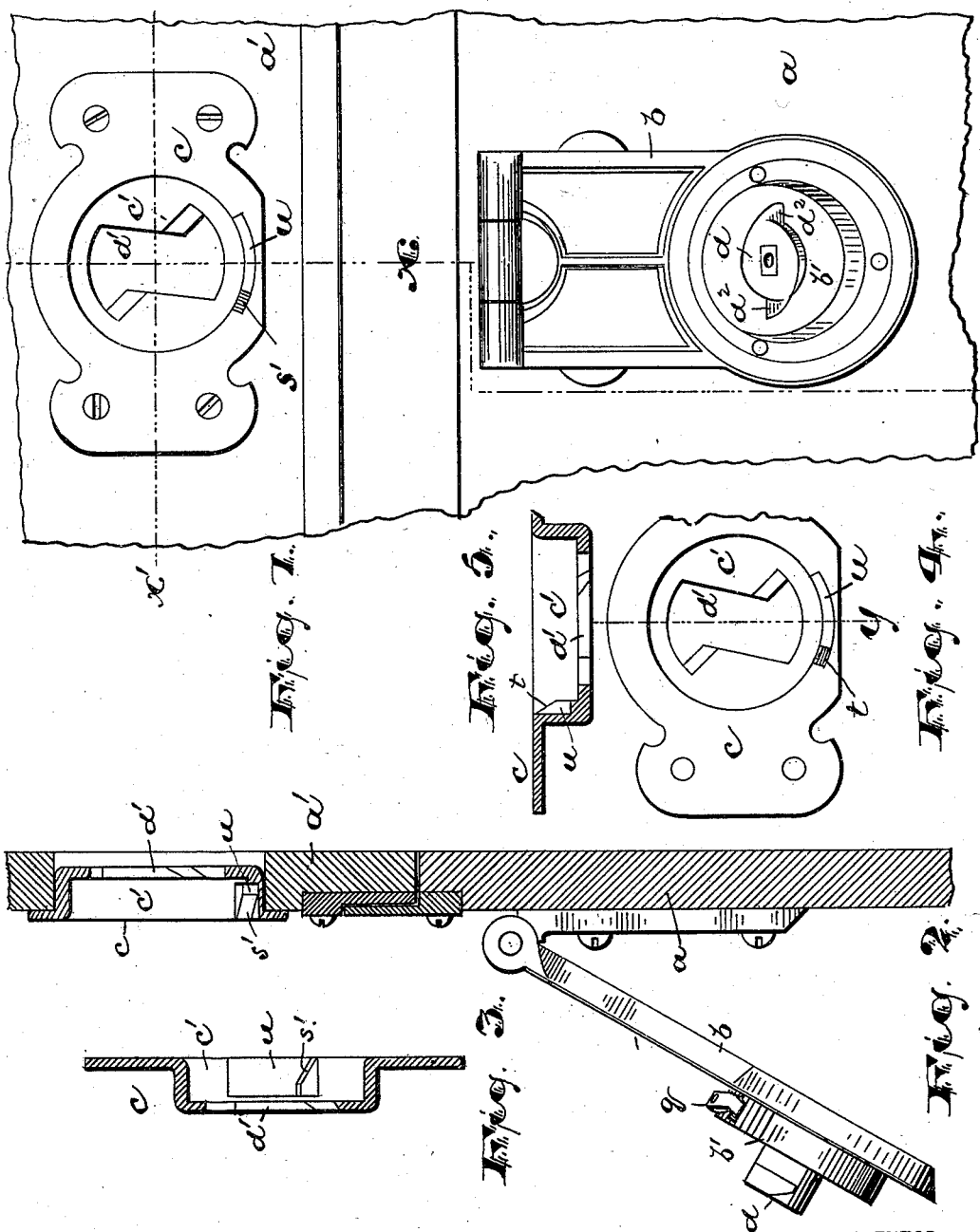
WITNESSES: INVENTOR:
Paul G. Vetter,
BY
ATTORNEYS No. 647,430. Patented Apr. 10, 1900.
P. G. VETTER.
LOCK.
(Application filed Dec. 23, 1899.)
(No Model.) 3 Sheets—Sheet 2.
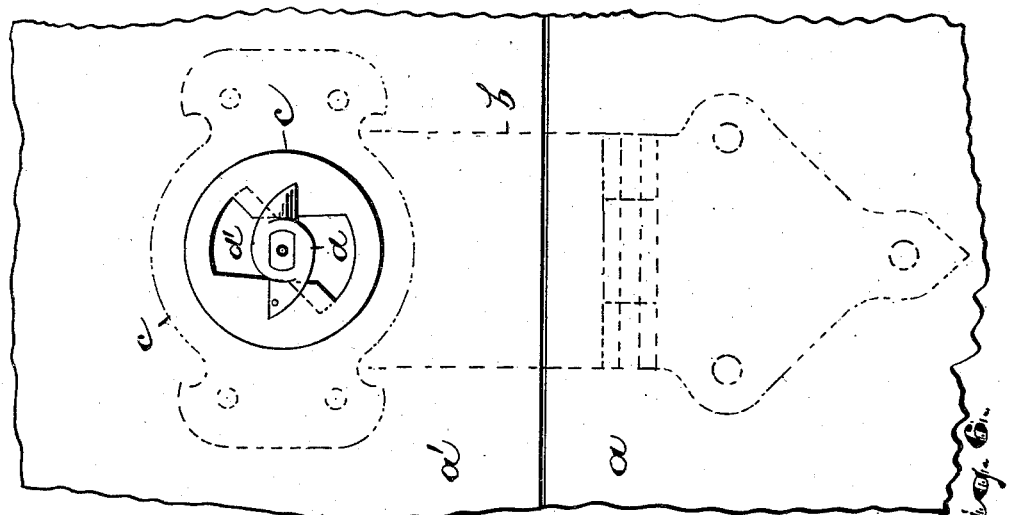
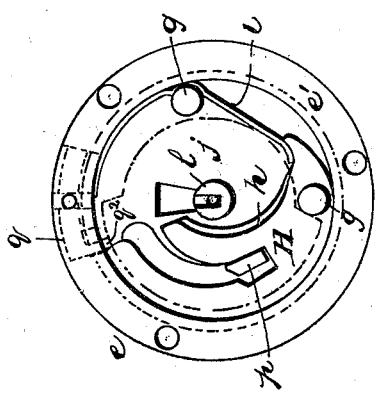
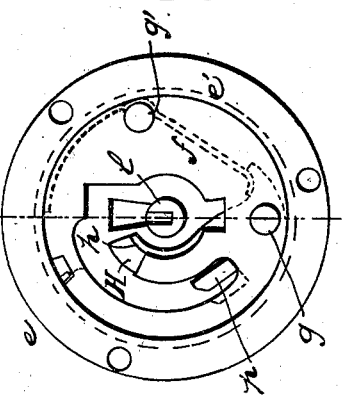
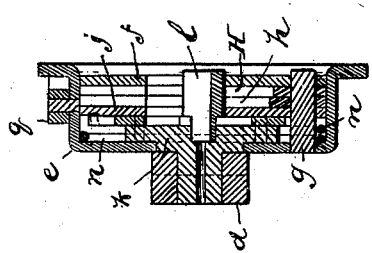
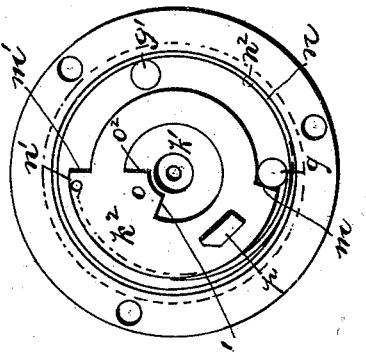
WITNESSES: INVENTOR:
Paul G. Vetter,
BY
Drake & Co.
ATTORNEYS No. 647,430. Patented Apr. 10, 1900.
P. G. VETTER.
LOCK.
(Application filed Dec. 23, 1899.)
(No Model.) 3 Sheets—Sheet 3.
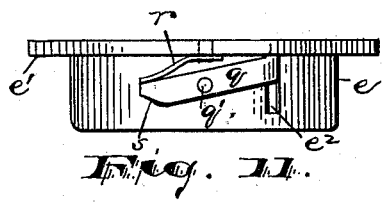
Fig. 11.
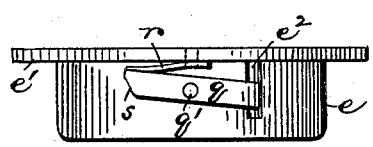
Fig. 12.
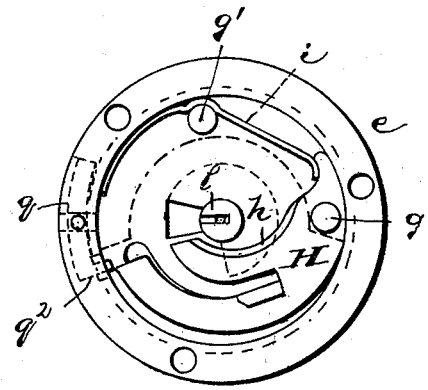
Fig. 13.
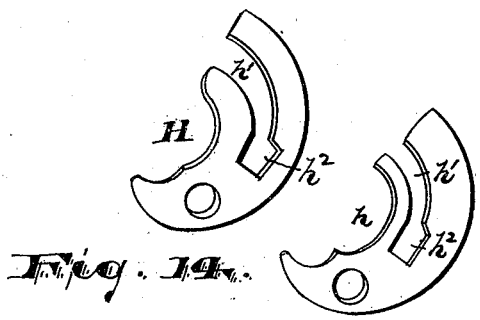
Fig. 14. Fig. 14½.
Fig. 15.
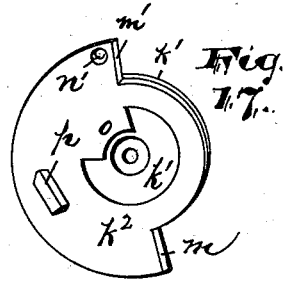
Fig. 17.
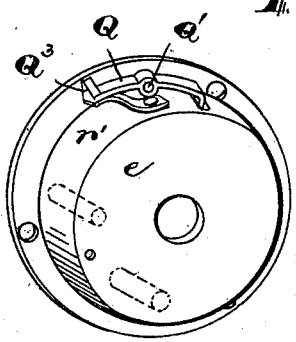
Fig. 20.
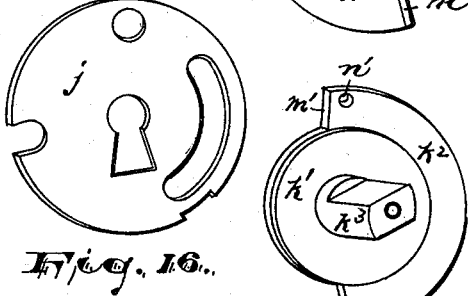
Fig. 16. Fig. 18.
Fig. 21.
Fig. 19.
WITNESSES:
Henry Krug
Russell M. Everett
INVENTOR
Paul G. Vetter,
BY
Drake & Co.
ATTORNEYS

UNITED STATES PATENT OFFICE.

PAUL G. VETTER, OF NEWARK, NEW JERSEY, ASSIGNOR TO GEORGE M. BALLARD, OF SAME PLACE.

LOCK.

SPECIFICATION forming part of Letters Patent No. 647,430, dated April 10, 1900.

Application filed December 23, 1899. Serial No. 741,454. (No model.)

*To all whom it may concern:*

Be it known that I, PAUL G. VETTER, a citizen of the United States, residing at Newark, in the county of Essex and State of New Jersey, have invented certain new and useful Improvements in Locks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The objects of this invention are to secure a hasp-lock which will lock automatically by simply pressing the hinged hasp into the coöperating keeper, to provide such a lock in which the parts are after unlocking automatically returned into position for locking and the lock thus always ready to be automatically locked, to enable this automatic action to take place whether the key is removed or not and to enable said key to be as well removed after locking as before, to enable either a flat key or a barrel-key to be used for opening the lock, to provide a cheap and simple construction, and to secure other advantages and results, some of which may be referred to hereinafter in connection with the description of the working parts.

The invention consists in the improved hasp-lock for trunks and in the arrangements and combinations of parts of the same, all substantially as will be hereinafter set forth and finally embraced in the clauses of the claim.

Referring to the accompanying drawings, in which like letters of reference indicate corresponding parts in each of the several views, Figure 1 is a front view of the hasp-lock and keeper applied to a trunk and showing the same in opened position. Fig. 2 is a section of the same on line $x$, Fig. 1. Fig. 3 is a sectional view of the keeper, taken on line $x'$, Fig. 1. Fig. 4 is a front view of a modified form of keeper sometimes preferred; and Fig. 5 is a section of the same on line $y$, Fig. 4. Fig. 6 is a rear view of the lock closed and showing the T-headed bolt in locked relation to the keeper. Fig. 7 is a plan of the lock proper detached from the hasp. Fig. 8 is a similar plan of the lock with the top plate removed and showing the parts in their unlocked position; and Fig. 9 is a plan showing the top plate, tumblers, and middle plate removed. Fig. 10 is a central cross-section of the lock on line $z$, Fig. 7. Fig. 11 is an edge view of the lock, showing the engaging position of a certain tumbler-detent in the unlocked lock; and Fig. 12 is a similar view of the same in its disengaging position when the lock is locked. Fig. 13 is a plan of the lock with its parts in locked position and the top plate removed. Figs. 14 and 14½ show in perspective the tumblers preferably employed. Fig. 15 is a spring for said tumblers. Fig. 16 is a view of one of the partition-plates. Figs. 17 and 18 are front and rear views, respectively, of the rotary bolt-carrier. Fig. 19 is a side view of a key which may be employed, and Figs. 20 and 21 show a modified form of tumbler-detent sometimes preferred.

In said drawings, $a$ indicates the body of a trunk or the like, to which is attached the hinged hasp $b$, and $a'$ indicates the cover of the trunk and having thereupon the keeper $c$. Said hasp carries at its end in the usual position a lock $b'$, adapted to be seated in the recess $c'$ of the keeper and having a T-headed bolt $d$, adapted to pass through a slot or aperture $d'$ in the bottom of the keeper and be turned to lie across said slot, at the back thereof, as shown in Fig. 6. The said keeper is one integral piece fixed upon the trunk-cover, and the T-headed bolt when the hasp and keeper are not pressed together into locked engagement oscillates against the power of a spring which normally holds said T-head in its transverse locking position with reference to the keeper-slot, as will be hereinafter more fully described. The lugs $d^2$ of the T-headed bolt are preferably beveled at the side, whereby as they strike the edges of the slot in the keeper when the parts are pressed together said bolt is rotated backwardly against the power of its spring to allow it to enter the slot. I may sometimes prefer to also bevel the edges of the slot to further facilitate the entrance of the bolt, or under some conditions the edges of the slot may be beveled and not the lugs of the bolt-head.

Referring now to the interior lock mechanism, which is inclosed in the case $e$, riveted by the flange $e'$ to the hasp, as is usual, $f$ is a stationary top plate which serves to partially cover the parts beneath and may be used or not, as desired.

$g$ and $g'$ indicate fixed posts projecting upward from the bottom of the lock-case $e$.

H and $h$ are tumblers pivoted on the post $g$ and actuated by a spring $i$, and $j$ is a stationary middle plate separating the said tumblers from the movable parts beneath. Below said middle plate $j$ is the oscillating bolt-carrier $k$, shown in the drawings as composed of a lower portion $k'$, having an upper plate $k^2$ riveted thereupon. Obviously these two parts could be cast in one piece, if preferred. Said bolt-plate rests at its lower side upon the bottom of the lock-casing and has a reduced stem $k^3$ projecting through an aperture in the bottom of the casing and being suitably shaped to receive at its extremity the T-head $d$.

The bolt-carrier $k$ is centrally recessed at the top to receive the lower end of a rotary key-guide $l$, which is commonly used in connection with flat keys and which bears at its opposite end in the keyhole in the hasp. If a barrel-key is preferred, the said carrier $k$ has instead of the recess an upwardly-projecting pin to receive the key, all as is common in the art.

The upper plate $k'$ of the bolt-carrier projects peripherally over the lower portion $k^2$, to which it is riveted, and is segmentally recessed to form stops $m$ $m'$, adapted to engage the studs $g$ $g'$ and limit oscillation of the bolt-carrier and bolt. A spring is also provided to normally hold the stop $m$ in contact with the post $g$, which secures such a position of the bolt-carrier $k$ that the T-headed bolt lies in its transverse or locked position. This spring may be arranged in any manner capable of effecting the result described; but I prefer to use a coiled wire $n$, lying near the walls of the casing $e$ and around the bolt-carrier $k$ and being secured at one end to the periphery of the plate $k'$, as at $n'$, and at the other end to the casing $e$, as at $n^2$. The middle of the plate $k'$ is open, and a segmental projection $o$ extends toward the center and provides a shoulder $o'$, against which the key may impinge to oscillate the bolt-carrier and bolt against the spring $n$ in unlocking. This reversed oscillation by the key continues until the stop $m'$ engages the post $g'$, when the T-headed bolt may be withdrawn from the keeper-slot. The key is also in this position in alinement with the keyhole-slot and may be withdrawn, when the spring $n$ will instantly return the bolt-carrier to its initial position. The key, however, is not necessarily withdrawn, for if only the pressure of the fingers upon the key is relaxed said key will be carried backward with the bolt-carrier under the power of the spring $n$. The key can then be freely removed at any time by turning it in a reversed direction until it engages the shoulder $o^2$ of the stop $o$ before described.

To secure a locking of the bolt-carrier against oscillation when the T-headed bolt is in locked engagement with the keeper, I employ one or more tumblers common in the art. These tumblers have a slot $h'$ with a recess $h^2$ at the closed end of said slot, and a stud $p$ upon the bolt-carrier works in said slot. When the lock is in locked condition, the tumblers are thrown and held in an inward position by the spring or springs $i$, as shown in Fig. 13, thus catching the stud $p$ in the recess $h^2$ and preventing oscillation of the bolt-carrier. When the lock is opened, however, by the key, said tumblers are pushed back against the wall of the casing $e$, so that the stud $p$ can pass through the slot $h'$. It is obvious that in my invention this locking of the bolt against oscillatory movement must occur only when the T-headed bolt is in locked engagement with the keeper and not when said bolt is merely in locking position, for this is its normal position at all times, and it must oscillate therefrom as it engages the keeper in automatically locking. To accomplish this feature of my invention, I prefer to use the means next described.

Upon the lock-casing $e$ I pivot a detent-lever having at one end a tooth extending through the casing to engage the extremities of the tumblers. A spring normally holds said lever in engagement with the tumblers, and the end of the lever opposite the tooth is adapted to be engaged by the keeper as the lock is seated therein and move the said lever against the power of its spring and release the tumblers.

The preferred form of detent-lever $q$ is pivoted upon the outer wall of the casing $e$ by means of a pin $q'$, so that it swings in a direction at right angles to the plane of the lock-case, the lever being suitably curved to lie adjacent to the case. One end of the lever is bent inward, as at $q^2$, through a slot $e^2$ in the casing, and this tooth catches the extremities of the tumblers, as shown in Fig. 8, as long as this toothed end of the lever is in elevated position, where it is normally held by a spring $r$. The opposite end of the lever is beveled, as at $s$, and when the lock is pressed into the keeper this beveled end of the lever engages a correspondingly-beveled seat $s'$ and turns the lever against the power of the spring $r$, releasing the tooth $q'$ from the tumblers and permitting them to act. In unlocking the lever $q$ at once regains its normal position as the hasp is opened from the keeper and the tooth catches the tumblers which have been pushed back by the key. Under some conditions I may pivot the lever upon the lock-case flange, as shown in Figs. 20 and 21 and marked Q, in which case it swings in the plane of the lock and the tooth moves in and out of the slot. For this form of lever a bearing $t$, slanting radially inward, must be formed on the keeper, as shown in Figs. 4 and 5. In both cases the lever lies in a recess $u$, formed in the walls of the keeper.

Sometimes in using the trunk in an unlocked condition it may be desired to prevent any possible inadvertent pressure of the lock-bolt into its keeper, such as would lock the trunk and necessitate a use of the key in again unlocking. Under these circumstances it will be obvious that a pressure of the finger upon the exposed detent will serve to release the tumblers, and thus lock the bolt against oscillation, so that it cannot enter the keeper. The original state of things can at any time be restored by use of the key, so that a locking of the trunk may be effected.

Having thus described the invention, what I claim as new is—

1. In a lock, the combination of a keeper, an oscillating lock-bolt, a spring normally holding said lock-bolt in locked position but permitting it to automatically enter the keeper, and means for positively holding said bolt against oscillation when in its keeper, said means being automatically operated by bringing the lock-bolt and keeper together, substantially as set forth.

2. In a lock, the combination of a keeper, an oscillating lock-bolt, a spring normally holding said lock-bolt in locked position but permitting it to automatically enter the keeper, a tumbler or tumblers for holding the lock-bolt from oscillating, and a detent for said tumblers adapted to be released by pressure of the lock-bolt into the keeper, substantially as set forth.

3. A hasp-lock for trunks, comprising a keeper, a hasp, an oscillating T-headed lock-bolt carried upon said hasp and adapted to engage said keeper, a spring forcing said bolt into locking position and means for locking said bolt against oscillation when pressed into the keeper, said means being operated by contact with the keeper, substantially as set forth.

4. In a hasp-lock, the combination of a keeper, a hasp, a lock-bolt normally held in locking position by a spring and capable of being oscillated against the power of said spring, a tumbler for holding said bolt against oscillation, and a detent for said tumbler, said detent being operated by contact with the keeper, substantially as set forth.

5. In a hasp-lock, the combination of a keeper, a hasp, an oscillating lock-bolt carried upon said hasp, a spring normally holding said bolt in locking position, a tumbler for positively holding said bolt against oscillation and a spring-controlled detent for holding said tumbler out of engagement, said detent being released by contact with the keeper whereby the tumbler engages the bolt, substantially as set forth.

6. In a hasp-lock, the combination of a keeper, a hasp, a lock upon said hasp and having an oscillating bolt adapted to engage said keeper, a spring elastically holding said bolt in locking position, a tumbler for positively holding said bolt in locking position, a key for releasing said bolt from said tumbler and a detent normally holding said tumbler free from the bolt, said detent being released by contact with the keeper and again becoming operative to engage the tumbler as the hasp is opened away from the keeper, substantially as set forth.

7. In a lock, the combination of a recessed keeper, having an inclined recess in the walls of the main cavity, a casing adapted to be seated in said keeper, a lock-bolt pivoted within said casing and adapted to engage said keeper, a spring normally holding said lock-bolt in locking position, and a detent-lever pivoted upon the outside of the casing and having one end bent inward through an opening in the walls of said casing, and the other end being adapted to be engaged by the walls of the said inclined recess in the keeper, substantially as set forth.

8. In a lock, the combination of a slotted keeper, having an inclined recess, an oscillating T-headed lock-bolt adapted to engage said keeper, a spring normally holding said bolt in transverse locking position with respect to the keeper, tumbler, and a tumbler-detent adapted to be engaged by the said inclined recess on the keeper, substantially as set forth.

9. In a lock, the combination of a slotted keeper, a casing adapted to be closed against said keeper, a spring-controlled oscillating T-headed bolt pivoted in said casing and adapted to be automatically forced into the said slot in the keeper, either said bolt or the edges of the slot being beveled for this purpose, and a detent for locking said bolt against oscillation when seated in the keeper, and being operated by engagement with the keeper, substantially as set forth.

10. In a lock, the combination of a slotted keeper having a tumbler-detent bearing, a casing adapted to be seated contiguous to said keeper, a T-headed bolt pivoted in said casing and normally held by a spring in transverse position with respect to the keeper-slot, the edge of said slot and the side of the T-headed bolt, or one of them, being beveled whereby said parts may be forced together into locked engagement, a tumbler for positively holding said bolt against oscillation, and a tumbler-detent adapted to be released by contact with the said bearing on the keeper, thus allowing the tumbler to act, substantially as set forth.

11. In a lock, the combination of a keeper, an oscillating lock-bolt, a spring normally holding said lock-bolt in locked position but permitting an automatic engagement with the keeper, a tumbler or tumblers for holding the lock-bolt against oscillation, and a detent normally engaging said tumbler or tumblers and having an exposed portion adapted to receive pressure whereby said detent is released, substantially as set forth.

12. In a lock, the combination of a keeper, a lock-casing adapted to be seated in said keeper, a spring-controlled lock-bolt pivoted in said casing and adapted to engage the keeper automatically, a tumbler for said lock-bolt, and a tumbler-detent comprising a lever pivoted upon the lock-casing, said casing being apertured and the inner end of the lever being adapted to engage the said tumbler while the outer end is exposed to receive pressure, substantially as set forth.

In testimony that I claim the foregoing I have hereunto set my hand this 18th day of December, 1899.

PAUL G. VETTER.

Witnesses:
CHARLES H. PELL,
RUSSELL M. EVERETT.